May 17, 1927.

C. L. MICHOD 1,628,854

VEHICLE STAY BLOCK

Filed Jan. 15, 1924

Inventor:
Charles L. Michod
By Ernest E. Tupes
Atty.

Patented May 17, 1927.

1,628,854

UNITED STATES PATENT OFFICE.

CHARLES L. MICHOD, OF CHICAGO, ILLINOIS, ASSIGNOR, BY MESNE ASSIGNMENTS, TO E. S. EVANS & COMPANY, INCORPORATED, OF DETROIT, MICHIGAN, A CORPORATION OF DELAWARE.

VEHICLE STAY BLOCK.

Application filed January 15, 1924. Serial No. 686,297.

The invention relates to stay blocks for vehicle wheels and more particularly to blocks which are adapted to be fastened to the floor of a car or the like in which the vehicle is being transported. The invention takes the form of a framework which is fastened at one end to the floor of the car with the other end bearing against the rim or tire of the vehicle wheel in such a way that movement of the vehicle wheel towards the block is prevented.

One of the objects of the invention is to provide a stay block adapted to be inexpensively constructed from standard structural materials and shapes.

Another object is to provide such a block which is light, strong, durable, and capable of being folded into a small space, thereby making feasible its return to the shipper at a substantially less outlay than its first cost so that its repeated use effects economies.

Another object is to provide a block which can be easily fastened to the floor of a car by the use of the simplest tools so as to be adapted for manipulation by unskilled labor and the labor cost be thereby kept at a low figure.

Another object is to provide a stay block constructed as a framework in such a way that the stresses transmitted thereto by its pressure against the vehicle wheel act axially along the members with substantially no shearing or bending stresses so that the cross section of the members may be kept small and the weight and expense of the material used therein be minimized.

These and other objects will be more fully set forth and described in the following specification and shown in the accompanying drawings in which.

Figure 1:
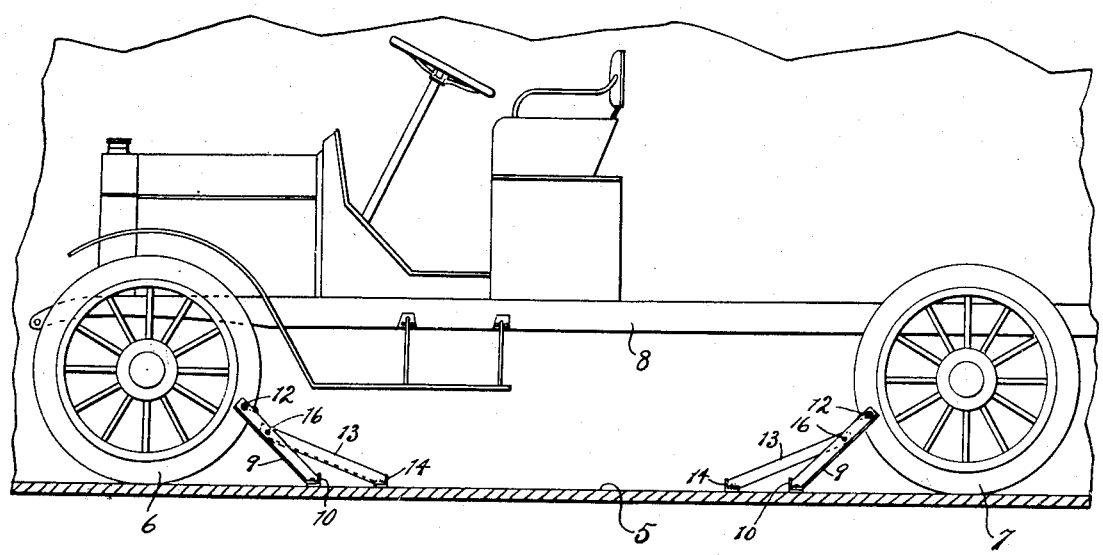
Fig. 1 is an elevational view of a vehicle showing the front and rear wheels each equipped with one of the blocks in position to prevent movement of the vehicle relative to the floor.

The invention, in its preferred embodiment, comprises a frame generally designated by the numeral 4. The frame is made up of legs 18 and 19 pivotally connected together by the rivets 16. A pair of spaced apart angle members 9 connected by a transverse angle member 10 and a bolt 12 comprises the leg 18. The vertical legs of the angle members 9 are adjacent and the outstanding legs are turned at their lower ends so as to fit snugly with the horizontal leg of the member 10 to which they are riveted. The leg 18 is fastened to the floor 5 by means of screws or nails driven through holes 11 formed in the member 10.

The bolt 12 is mounted on the vertical legs of the members 9 and is shaped to fit the tread or bearing of the tires 6 and 7. The members 9 can be made of any desired length and with any desired angle with the horizontal. The device is found to operate satisfactorily when the bolt 12 is at an elevation above the floor of approximately one-third of the diameter of the vehicle wheel and the leg 18 extends at approximately forty-five degrees with the horizontal. The spacing of the members 9 and the shape of the bolt 12 can be varied to adapt the device for use with all sizes and shapes of tires and with all vehicles from the lightest automobiles to the heaviest trucks. The bolt 12, by reason of its pivotal mounting, will be caused to bear against the tire and produce a thrust having its line of direction through the axis of the wheel regardless of the elevation of the point of contact of the bolt or the amount of thrust exerted by the wheel. This feature of having the direction of the thrust from the block to pass through the axis of the wheel eliminates any tendency of the wheel to rotate as the result of the thrust as is the case with the massive, rigid blocks heretofore in use. When the various members are arranged in this manner, the radial line through the bearing point on the tire will, if extended, strike the floor of the car adjacent the member 14, with the result that the tendency of the device to overturn is minimized.

The leg 19 is provided as a reenforcing member for the leg 18. For this purpose the leg 19 is pivotally connected at its upper end at a point distant substantially one-quarter of the length of the leg 18 from its upper end and the length of the leg 19 is made such that its angle of intersection with the leg 18 is preferably approximately that of the angle it makes with the floor of the car to which it is fastened. The members 13 are held in spaced apart relation by the lower angle member 14 and the upper angle member 15. The leg 19 is fastened to the floor of the car by driving nails or screws through holes 17 which are provided for the purpose in the angle member 14.

The device is attached to a vehicle by positioning a pair of the blocks preferably between the wheels as shown in Fig. 1, or they may also be placed if desired with one in front of the front wheel and the other in the rear of the rear wheel. The legs 18 are then fastened to the car floor in such a way that the bolt 12 presses against the tire after which the legs 19 are fastened to the floor after first being thrust towards the wheel to increase the pressure between the bolt and the tire.

Figures 2, 4:
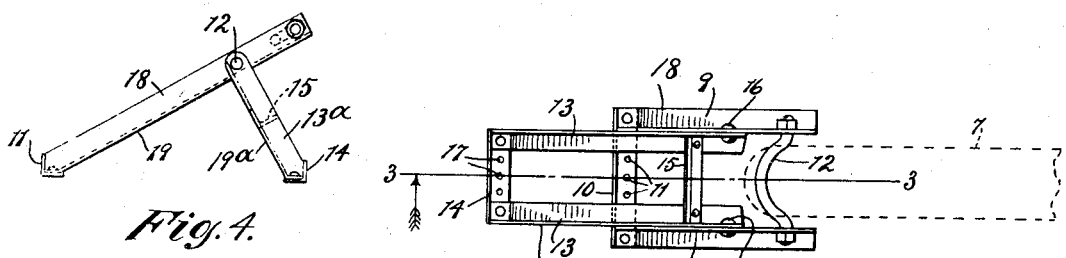
Fig. 2 is a top plan view of the preferred form of the device.
Fig. 4 is an elevational view of an alternative form of the device.

An alternative form of the device is shown in elevation in Fig. 4. The leg 18 is the same as in the preferred form while the leg 19ª differs therefrom by being positioned underneath the leg 18 and having its angle members 13ª shorter than the corresponding members 13.

Figures 3, 5:
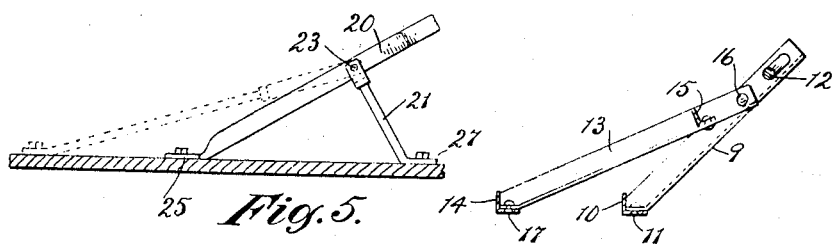
Fig. 3 is a sectional view along the line 3—3 of Fig. 2.
Figs. 5 and 6 are elevational and plan views respectively of still another embodiment of the invention.
Figure 6:

Still another embodiment of the invention is illustrated in Figs. 5 and 6 in which the legs 20 and 21 are unitary members pivotally connected by a rivet or bolt 23. The upper forked end of the leg 20 forms a seat 24 for the tire of the wheel. The lower end is turned and extended to form a base 25. The base 25 is provided with apertures 26 through which nails or screws may be driven to fasten the leg 20 to the floor. The leg 21 is provided to reinforce the leg 20 and to form in connection therewith and with the car floor a triangular frame capable of resisting the thrust from the wheel. The leg 21 is forked at its upper end and apertured for pivotal connection with the leg 20 by means of the bolt 23. The lower end of the leg 21 is turned and extended to form a base 27 which is provided with apertures 28 for fastening to the car floor by nails or screws.

The device is adapted, by reason of the pivotal connection of the legs, for use with wheels of different diameters and may be mounted either between the wheels with the block pressure acting towards the adjacent end of the vehicle or exteriorly of the wheels with the block pressure acting towards the opposite end of the vehicle.

Thus it will be seen that the invention provides a block which can be constructed of standard structural members to form a pair of legs pivotally connected together and fastened to the floor of the car so as to form therewith a triangular frame taking axial stresses only and which reacts against the tendency of the vehicle to move, by producing a thrust radially through the axis of the wheel, and which by reason of its frame like structure is not subject to bending or shearing stresses in its members so that the device is light, durable, strong and capable of economies in construction and in repeated use.

I claim:

1. In a device of the class described, a frame comprising a pair of legs pivotally fastened together near their upper ends and diverging downwardly, means adapted to fasten the lower ends of the legs to a floor, and means on one of said legs adapted to engage a vehicle tire and prevent movement of the vehicle towards the device, comprising a bolt, a pair of bearings in which the bolt is pivotally mounted, the said bolt being curved outwardly between said bearings to fit the outer periphery of the tire.

2. In a device of the class described, a frame comprising a pair of downwardly diverging legs pivotally fastened together near their upper ends, one of said legs projecting beyond the pivot point and comprising a pair of transversely spaced apart members, a transverse member pivotally mounted in the projecting portion of said leg, said transverse member being shaped to snugly engage the periphery of a vehicle tire, and means on the legs adapted to rigidly fasten the device to a car floor with said transverse member in engagement with a vehicle tire.

3. In a device of the class described, a frame comprising a pair of legs fastened together near their upper ends and diverging downwardly, means on the lower ends of said legs adapted to fasten the device to a floor, and means on the upper end of the device adapted to engage the tire of a vehicle and prevent movement of the vehicle towards the device, the point of engagement of the device with the tire being such that the radial line therethrough will, if extended, strike the floor of the car adjacent the lower end of the leg most remote from the wheel.

4. In a device of the class described, a frame comprising a pair of downwardly diverging legs pivotally fastened together near their upper ends, one of said legs projecting beyond said pivotal connection and comprising a pair of transversely spaced apart members, a transverse member pivotally mounted on the projecting portion of said leg, comprising a rod having its mid-portion of arcuate shape adapting it to fit the tread portion of a vehicle tire, and means on the legs adapted to rigidly fasten the device to a car floor.

Signed at Chicago, Ill., this 12th day of January, 1924.

CHARLES L. MICHOD.